United States Patent
Nagesha et al.

(10) Patent No.: US 11,128,580 B2
(45) Date of Patent: Sep. 21, 2021

(54) EMAIL COMPOSITION ASSISTANCE BASED ON OUT-OF-OFFICE RECIPIENTS IN DISTRIBUTION LISTS

(71) Applicant: AIRWATCH LLC, Atlanta, GA (US)

(72) Inventors: Supritha H Nagesha, Bangalore (IN); Sijo Panthalookaran Poulose, Bangalore (IN); Rwithu Ramesh Menon, Bangalore (IN); Ponnie Rohith, Bangalore (IN); Sachin Vas, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 746 days.

(21) Appl. No.: 15/406,807

(22) Filed: Jan. 16, 2017

(65) Prior Publication Data
US 2018/0131647 A1    May 10, 2018

(30) Foreign Application Priority Data
Nov. 10, 2016  (IN) .............................. 201641038491

(51) Int. Cl.
*G06F 15/16* (2006.01)
*H04L 12/58* (2006.01)

(52) U.S. Cl.
CPC ............ *H04L 51/04* (2013.01); *H04L 51/043* (2013.01); *H04L 51/14* (2013.01)

(58) Field of Classification Search
CPC ......... H04L 51/04; H04L 51/22; H04L 51/14; H04L 51/043
See application file for complete search history.

(56) References Cited

U.S. PATENT DOCUMENTS

| | | | | |
|---|---|---|---|---|
| 6,684,238 B1* | 1/2004 | Dutta | .................. | G06Q 10/107 709/203 |
| 8,539,029 B2 | 9/2013 | Manning et al. | | |
| 2003/0120733 A1* | 6/2003 | Forman | .................. | H04L 51/28 709/206 |
| 2008/0104177 A1* | 5/2008 | Keohane | .............. | G06Q 10/107 709/206 |
| 2009/0259723 A1* | 10/2009 | Roic | .................... | G06Q 10/107 709/206 |
| 2012/0215852 A1* | 8/2012 | Chen | ....................... | H04L 51/12 709/206 |
| 2013/0339162 A1 | 12/2013 | Manning et al. | | |
| 2013/0339462 A1* | 12/2013 | Manning | .............. | G06Q 10/107 709/206 |
| 2015/0248410 A1* | 9/2015 | Stickler | ............... | G06F 17/3053 707/728 |

\* cited by examiner

*Primary Examiner* — Cheikh T Ndiaye
(74) *Attorney, Agent, or Firm* — Clayton, McKay & Bailey, PC

(57) ABSTRACT

When a sender is drafting an email, a system herein can determine whether a user in a distribution list is out-of-office. The email application can identify a distribution list to a server along with a target date, such as a meeting date of an email invite. The server can check an out-of-office status for the contacts associated with the distribution list, and return a notification to the email application. The notification can indicate the number of out-of-office users. It can also indicate which users are out-of-office and suggest dependent users to fill in as alternatives.

20 Claims, 6 Drawing Sheets

EMAIL COMPOSITION ASSISTANCE BASED ON OUT-OF-OFFICE RECIPIENTS IN DISTRIBUTION LISTS

RELATED APPLICATION

Benefit is claimed under 35 U.S.C. 119(a)-(d) to Foreign Application Serial No. 201641038491 filed in India entitled "EMAIL COMPOSITION ASSISTANCE BASED ON OUT-OF-OFFICE RECIPIENTS IN DISTRIBUTION LISTS", filed on Nov. 10, 2016, by AIRWATCH LLC, which is herein incorporated in its entirety by reference for all purposes.

BACKGROUND

Users in an enterprise environment and elsewhere commonly use distribution lists when sending emails to multiple users. A distribution list is a collection of contacts. The distribution list can allow a sender to schedule a meeting with everyone on the list. The distribution list can also ensure that every member of a group or team is included on an important email, such as a meeting invitation.

However, the sender might not know which of the members in the distribution list are out of office. Users can set up autoreply emails, but these only notify the sender after the email is sent. If an important recipient is out of office, the sender may wish to reschedule a meeting. This can cause confusion and disruption to the other users. Alternatively, the sender might try to locate a replacement for the out-of-office recipient. But this can require forwarding the prior email to the replacement user, and the replacement user might be left off replies to the original email that went out to the distribution list.

MICROSOFT ACTIVE DIRECTORY provides a mechanism for indicating out-of-office users within OUTLOOK. But the mechanism only works for individual email addresses. This requires the sender to provide individual user email addresses to OUTLOOK rather than a distribution list. If the sender uses a distribution list, ACTIVE DIRECTORY is unable to detect if the users within the distribution list are out of office. As a result, the problems persist when sending emails, such as meeting invites, to large, groups of users without knowing who is out of office. Additionally, ACTIVE DIRECTORY does not assist the user with a contingency plan when a recipient is out of office.

For at least these reasons, a need exists for email systems that detect out-of-office recipients in distribution lists and provide appropriate contingencies.

SUMMARY

An example system can include a server that communicates with an email application on a sender device. The email application can request that the server check the out-of-office status for users in a distribution list that a sender includes in a draft email. When the sender adds the distribution list to a composition graphical user interface ("GUI") of the email application, the email application can notify the server. In one example, a management agent installed on the sender device communicates with the server on behalf of the email application.

The system can identify the email recipients associated with the distribution list. This can be done by either identifying the distribution list to the server or by passing individual recipient email addresses from the distribution list to the server. In one example, the management agent operates in the background by automatically expanding the distribution list. This can include resolving the distribution list at the server to receive the recipient email addresses that are part of the distribution list. The management agent can receive the recipient email addresses in a background process to avoid cluttering the email composition GUI with the recipient email addresses. Then the management server can send those individual recipient email addresses to the server to check the out-of-office status of each recipient email. In another example, the email application sends the distribution list to the server, and the server determines the associated contacts (such as recipient email addresses). Then the server can check the out-of-office status for each recipient email.

The server can determine an out-of-office status for each of the email recipients by checking user profiles associated with the recipient email addresses. The user profiles can include a current out-of-office status or can link to a history of known out-of-office events. The out-of-office events can include dates or date ranges collected from other sources within the system. For example, employees can request and be granted leave using systems that tie into the server in one example.

After checking the out-of-office status for the email recipient, the server can notify the email application of the results. This can occur prior to the email application sending the email, while the sender is still drafting the email. The server can send a notification indicating that a first email recipient is out of office. The first email recipient can be one of many recipients associated with the distribution list. The terms "first" and "second" are not meant to imply rank, but are used to distinguish between email recipients in a distribution list.

The notification can cause the email application to display an out-of-office alert. In one example, the notification includes a ranking for the out-of-office recipient that the email application uses in determining whether or how to display the alert. For example, a ranking above a threshold can cause a message containing the alert to be displayed to the sender, in an example. In another example, the ranking being above a threshold can cause the email application to display an additional alert when the user hits send in the email application, to confirm that the user intends to send the email, such as an invite, despite an important recipient not being available.

The email application can also suggest a replacement user for the first email recipient who is out of office. In one example, at least one replacement user is sent from the server with the notification to the email application. The server can determine the replacement user by checking dependency information associated with the first user (i.e., first email recipient). The dependency information can include other users that can serve as replacements for the first user. In one example, the first user can specify ahead of time who could take their place, and that user is stored as a dependency. In another example, a secure email gateway ("SEG") can capture email and forward dependency information to the server. For example, an automatic reply email can identify an alternate contact that can serve as a dependency. Prior to the sender drafting an email the SEG can capture autoreply information based on a prior email being sent to a recipient. The autoreply information can then be used at the server to set out-of-office status or to provide a dependency to a sender user. In another example, the server can collect other emails to or from the first user. The server can recommend a replacement user by matching attributes between a collected email and the draft email and suggesting other users from the collected email.

The server can be a management server in an example. The management server can manage various aspects of the sender's user device through communications with the management agent installed on that device. Alternatively, the server can be an ACTIVE DIRECTORY server or other mail server. In one example, the management server can operate in conjunction with the ACTIVE DIRECTORY server to perform the various server-based stages of the system.

It is to be understood that both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

An example system can assist a user with composing an email by notifying the user of recipients in a distribution list that are out of office. The system can further recommend dependent users to serve as replacements for the out-of-office users, in an example.

Figure 1:
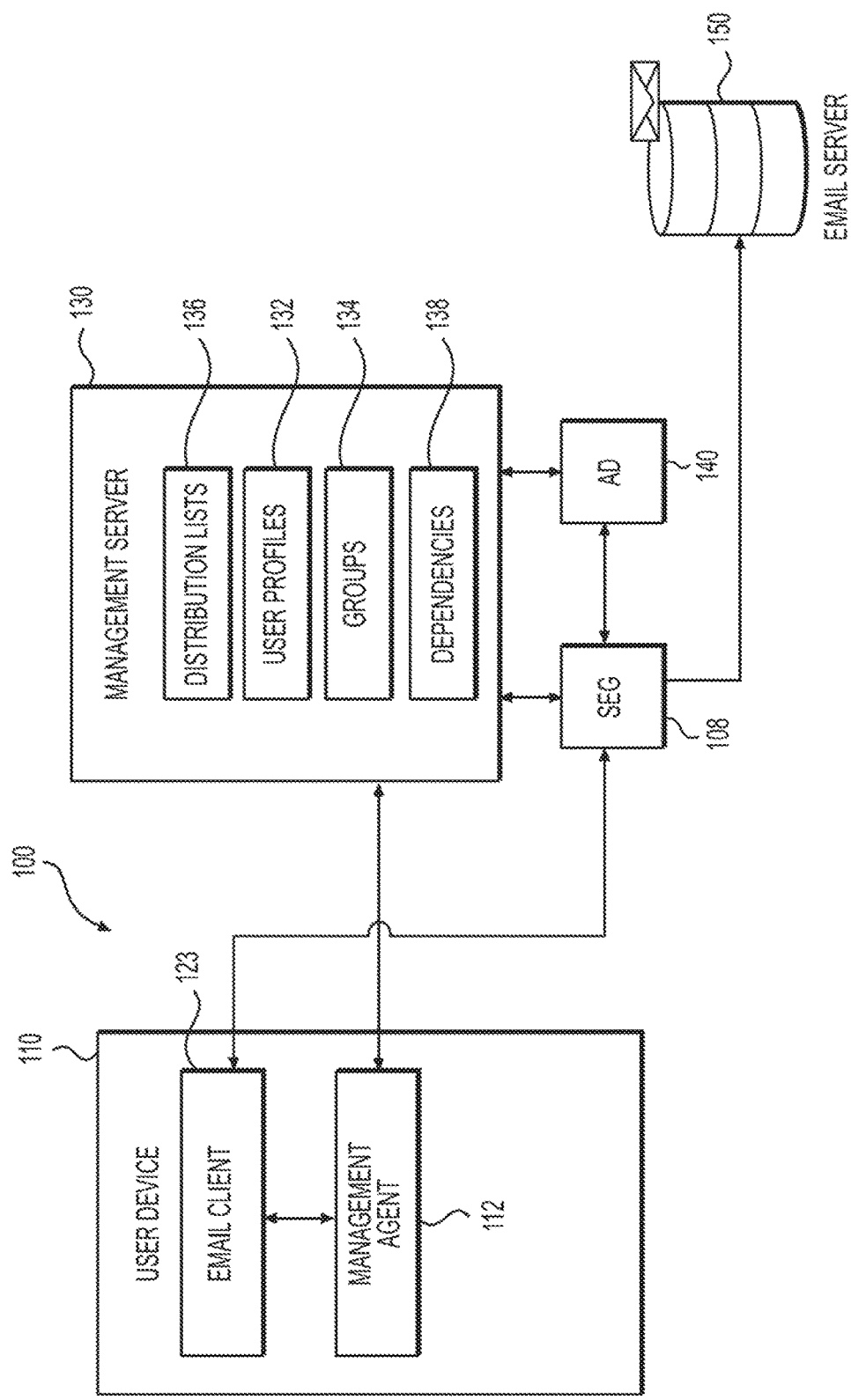
FIG. 1 is an exemplary illustration of system components.

FIG. 1 illustrates an exemplary system 100 for assisting with email composition. The system can include a server, such as a management server 130 or ACTIVE DIRECTORY ("AD") server 140. The server can store a set of email addresses associated with one or more domains. In one example, the server can also track various information about users associated with those email addresses. For example, the server can track an out-of-office status for users.

A user device 110 can allow a user to compose emails using an email client 123. A sender device is a user device 110 associated with a user that is drafting or sending an email. The user device 110 can be any computing device, such as a cell phone, laptop, tablet, personal computer, workstation, television, or television receiver. Each can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others. The user devices 110 and management server 130 can communicate wirelessly.

The user can utilize an email client 123 to compose the email. For convenience, the composing user is also referred to as a sender below. Intended recipients are referred to as recipient users. Email client 123 can be a managed application in one example. Managed applications can be installed for enterprise use and managed by the management server 130. Alternatively, email client 123 can be a general application, such as OUTLOOK. In one example, by managing the email client 123, enterprise-related email files can be isolated from personal files stored on the user device 110, as will be further described.

Within the email client 123, the sender can utilize a GUI to compose the email. The GUI can have fields for indicating recipient email addresses, such as TO, CC, and BCC fields. The user can add a distribution list to any one of these fields. Adding a distribution list can be done by selecting a pre-existing distribution list, in an example. The GUI can provide a drop-down list or other mechanism to browse available distribution lists. The user can also type in the name of the distribution list.

After the distribution list is added, the email client 123 can contact a server 130 or 140 to determine whether any of the recipient users in the distribution list are out of office. The out-of-office status can be determined based on the current time for some types of emails. For other types of emails, such as invitations for meetings that occur in the future, a proposed date and time can be used for determining out-of-office status.

A server 130, 140 can assist with email composition by determining if any of the recipient users in a distribution list are out of office. Servers 130 and 140 can be located remotely from the user device 110. In one example, one or more of the management server 130 and AD server 140 can be located on a cloud-hosted environment.

The server that assists with email composition ran be the management server 130, AD server 140, or both. It is to be understood that the functions described as performed by the management server 130 could be performed by the AD server 140, and vice versa, depending on the example. Many enterprise-management features are discussed below with regard to the management server 130, for convenience, but can equally apply to the AD server 140.

The management server 130 can allow an enterprise to manage aspects of an enrolled user device 110, including email functionality. The AD server 140 can facilitate email functions for WINDOWS domain networks. In one example, the servers 130 and 140 can be standalone servers or different groups of servers. Alternatively, the management server 130 and AD server 140 can be part of the same server or group of servers. For example, the management server 130 can run ACTIVE DIRECTORY domain services, in an example. Also, ACTIVE DIRECTORY is only used as an example, and other domain-specific servers or domain services are possible. For example, SAMBA is a networking solution for LINUX. The disclosures herein are not meant to be limited to any one particular domain service.

In one example, the user device 110 can enroll with the management server 130 to be configured for email composition assistance, among other managed functionality. In one example, the user device 110 downloads and installs a management agent 112 from the management server 130 during enrollment. In another example, the management agent 112 is part of, or provided with, the operating system of the user device 110 or the email client 123, existing on the user device 110 prior to enrollment. After enrollment, the management server 130 can send messages to the management agent 112 to control certain functions on the user device 110, including functions related to email composition.

The user device 110 can execute an email application 123 that includes functionality for creating and sending a meeting invite. This can include selecting recipients, picking a meeting day and time, and attaching a file relevant to the meeting. The email application 123 can be installed on a user device 110 from the management server 130, through communications with the management agent 112, for example. Likewise, the management server 130 can utilize the management agent 112 to uninstall the email application 123. This can be done, for example, if the user device 110 is lost or if an employee leaves the job. When the email application 123 executing on the user device 110 sends an email, it can be routed to a SEG 108. The SEG 108 can forward the email to the email server 150.

In one example, the management server 130 and email client 123 can communicate with each other through the management agent 112. This can allow the management server 130 to check out-of-office status during email composition. When the user modifies a recipient filed, such as TO, CC, or BCC, by adding a distribution list, the management agent 112 can be notified. In one example, the email application 123 itself can be a managed application designed to communicate securely with the management server 130 over a network. In that case, some or all of the management agent 112 can be built into the email application 123. Therefore, the management agent 112 can execute on a user device 110 as a stand-alone process or as an integrated part of the email application 123, depending on the example.

The management agent 112 can include a device-level component, such as an application programming interface ("API"), agent application, hypervisor, or virtualized device. The management agent 112 can also include an application-level component, such as an API, SDK, app wrapper, or workspace agent app. The device-level management agent 112 can include system level privileges. The application-level management agent 112 can include privileges in managed applications, which can be developed for operation with the management server 130. Reference to the management agent 112 is understood to include either or both of the device-level and application-level components unless otherwise specified. Additionally, the managed email application 123 can be one of multiple managed applications that execute on a user device 110 executing a management agent 112.

A backend portion of the management agent 112 can execute on the management server 130. This can allow the managed applications of the user device 110 and the management server 130 to securely communicate with one another. In one example, the management agent 112 communicates between the user device 110 and the management server 130 by using tokens or key pairs. The token can be used to identify the user device 110 to the management server 130.

In one example, the management agent 112 sends a message to the management server 130 that the management server 130 uses to check out-of-office statuses for the users in a distribution list 136. This can occur, for example, when the sender adds a distribution list to a recipient field of the email composition GUI, such as the TO, CC, or BCC field.

The message can indicate the distribution list for status checking. For example, the user can enter the "Marketing Team" distribution list in the TO field, and the email client 123 can send a message (through the management agent 112) to the server 130 or 140. The message can include "Marketing Team" or an identifier that the server 130 or 140 associates with that distribution list.

Alternatively, the message can be one or more messages that individually identify the contacts in the distribution list. For example, the management agent 112 can expand the distribution list in the background. This can include sending a request to server 130 or 140 requesting the contacts for the "Marketing Team" distribution list. The server 130 or 140 can return those contacts. Then, the management agent 112 can individually send the contacts to server 130 or 140 to check out-of-office status. This approach can be particularly useful with respect to the AD server 140, which can be an unmanaged server. Because it is not directly under control of the management server 130, it might lack the capability of returning out-of-office statuses for individual users based solely on a distribution list. But it can be capable of checking the out-of-office status of an individual user. The management agent 112 can automatically expand the distribution list at the user device 110, and then cause the AD server 140 to serially check the individual users of that distribution list. However, whether this expansion of the distribution list occurs at the user device 110 or server 130 or 140 depends on the example.

The management server 130 or AD server 140 can store a collection of distribution lists 136. Using the distribution list identified in die message from the email client 123, the server 130 or 140 can return the associated contacts from the stored distribution lists 136.

The distribution lists 136 can be created by enterprise users to ensure that a consistent group of recipients receive email traffic. For example, the email client 123 can have an option to create a distribution list. The user can name the distribution list and provide email addresses or other contacts to add to the distribution list. The other contacts can be retrieved, for example, from an address book that is accessible by the email client 123. The distribution list can then be stored in the collection of distribution lists 136 on the management server 130 or AD server 140.

Additionally, the management server 130 or AD server 140 can include stored user profiles 132. The user profiles 132 can include contact information and out-of-office information. The management server 130 can match contacts from the distribution lists 136 to user profiles 132. This can allow the management server 130 to check the out-of-office information for each recipient in the distribution list. User profiles 132 can also include other information about the user and user devices 110 associated with the user.

The out-of-office information can include calendar information in one example. Date ranges indicating when a user will be out of the office can be stored for each user. This can allow the server 130 or 140 to detect future instances when the user will be out of office. For example, the management server 130 can receive vacation or leave requests and track dates that an employee will be out of the office. In another example, the management server 130 can access a calendar associated with the user and read some events as indicating that the user is unavailable. In another example, the user profile includes an out-of-office status that the management server 130 updates based on one or more sources that reveal the user's status.

After checking out-of-office status, the management server 130 can notify the email application 123 of recipients in the distribution list that are out of office. The management server 130 can further send notifications to the email application 123 by communicating with the user device 110 through the management agent 112. The notification can cause the email application 123 to display alerts to the sender. The alert can let the sender know that at least one recipient is out of office.

In one example, the management server 130 sends a notification that identifies out-of-office users and their associated email addresses. The notification can be a series of messages in one example, such as one message for each recipient that the management server 130 detects is out of office.

In another example, the notification includes a ranking for each out-of-office user. The ranking can generally reflect how important the particular user is to an email, such as a meeting invitation. If the ranking exceeds a threshold, the email client 123 can draw extra attention to the fact that the highly ranked user is out of office. For example, the email client 123 can color the send button red and provide an extra notification to the user when the user attempts to send the email, to make sure that the user still wants to send the email despite a conflict with the important user's schedule. In one example, a ranking above a threshold can cause the email client 123 to prompt the sender to acknowledge or accept a replacement user. The management server 130 can turn off functionality at the user device 110, such as disabling or greying out a send button on the GUI until the sender resolves the alert by selecting a dependency or cancelling the alert. Replacement users, also called dependencies 138, will be discussed in more detail below.

The ranking can be based on die user's position in the enterprise. In one example, the ranking can be determined from the user profile 132. Rules can translate job titles, or job codes from the user profile into rankings. In another example, the ranking can be determined based on the user's association with a user group 134. A user can belong to one or more user groups 134. The management server 130 can utilize the user groups 134 to configure a user device 110 with different functionality depending on which groups 134 the user belongs to. For example, a first user group 134 can exist for executives and a second user group 134 for quality control. The enterprise files and applications that are accessible can be different for different groups 134. Similarly, different rankings can be assigned to different groups 134. An executive group can have a higher ranking than a quality control group, for example.

In another example, the ranking of each user in a distribution list is determined relative to the other users in that distribution list. For example, in a list full of quality control users, a manager can be ranked very highly. However, that same manager can have a low ranking in a distribution list that contains mostly executives.

The ranking of an out-of-office recipient can be used by the email client 123 to prompt the user regarding whether they still want to send a meeting invite. In one example, if the ranking is high enough, contact information for an assistant to the absent user can be provided to the sender. In still another example, the dependency 138 is provided by notifying the sender of another user in the distribution list with the same or higher ranking as the absent user.

In one example, the management server 130 also determines potential replacement users, called dependencies 138, for out-of-office users. Dependencies 138 can be determined in advance in one example, and linked to particular users. When a recipient in a distribution list is determined to be out of office, the management server 130 can provide a dependency 138.

In one example, dependencies 138 can be set in advance by the users themselves. For example, the user can use an application to indicate days that they will be out of office. They can also indicate someone to contact in their place. That replacement user can be stored as a dependency 138 for the user. In one example, the management server 130 checks multiple application databases for dependencies 138 when there is more than one way a user can indicate that they are out of office. For example, first and second applications might both provide scheduling functionality, along with a calendar application. The management server 130 can query all three sources to determine if a user has indicated another user to take their place on a task while they are out of office. The management server 130 can set out-of-office information in the user profiles 132 and link users to dependencies 138 using this approach.

In still a further example, the SEG 108 can detect email traffic, such as an autoreply, that indicates the user is out of the office, and forward that information to the management server 130. The SEG 108 can receive and route electronic message traffic. The SEG 108 can serve as a proxy or entry point through an enterprise firewall, and can route electronic messages to an email server 150 within the firewall. The electronic message traffic can include emails and meeting invites, such as calendar invitations. A meeting invite can be an email in one example. Alternatively, it can be a different object type that is sent to user devices 110 by email address. The term "email" is used for convenience, and is meant to refer to all suitable electronic message types. The terms "meeting invite" and "meeting invitation" are used interchangeably.

The SEG 108 can provide security to the email server 150 and an enterprise network by processing email to defend against malware and spam. If the SEG 108 determines that an electronic message should not be blocked, the SEG 108 can send the electronic message (e.g., email) through a firewall to the email server 150. The SEG 108 can further remove sensitive attachments and other information from an email when an email is being sent outside of an enterprise network. The SEG 108 and functionality of SEG 108 can be combined with the email server 150 or ACTIVE DIRECTORY server 140, in an example.

In another example, the management server 130 can determine a user is out of office by checking with one or more other systems. Other systems can track user activities, including whether the user will be in the office of not. In one example, the management server 130 can check with the other systems and update its own out-of-office status based on the information in the other systems. This can include updating an out-of-office status for an individual user or group of users. It can also include sending a message to the AD server 140 to cause the AD server 140 to update the user's out-of-office status.

In one example, the management server 130 checks the other systems by using APIs specific to those systems. The management server 130 can request the out-of-office status or other information using the APIs. In another example, the management server can check the user's status in a managed application other than the email client 121. For example, a task-tracking application such as JIRA could allow users to indicate when they are out of office or otherwise unavailable. The management server 130 can send a message to the managed application to receive the user's out-of-office status.

The management server 130 can replicate out-of-office status changes to the AD server 140 in an example. This can allow the AD server 140 to more accurately report out-of-office users. This can be particularly important in examples where the AD server 140 determines which users in a distribution list are out-of-office.

The network over which files are sent and retrieved can be an enterprise network in one example. The network can include the Internet, a local area network, or any other suitable communication platform. The user device 110 can communicate over the network using one more modulators, demodulators, multiplexers, demultiplexers, network communication devices, wireless devices, antennas, modems, and any other type of device configured to enable data communication through a communication network.

The management server 130 can include one or more servers and can also be protected by a corporate firewall. Each server can include one ore more processors that execute instructions stored on a non-transitory, computer-readable medium. Similarly, the AD server 140, SEG 108, and email server 150 can each include one or more servers and processors.

The servers 130, 140, and 150 and user devices 110 can each utilize one or more processors. The term "processor," as generally used herein, can refer to any logic processing unit, such as one or more central processing units (CPUs), digital signal processors (DSPs), application specific integrated circuits (ASICs), field programmable gate arrays (FPGAs), and similar devices. The processor can include one or more processors, each configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

The user device 110 or management server 130 can also include an I/O module, such as a console with an integrated keyboard and mouse to allow a user to input parameters associated with system 100. An I/O module can also include a display including a graphical user interface (GUI) for outputting information on a screen.

Although an example has been described where the email application 123 and other applications are managed applications, the applications can also be unmanaged applications. In addition, the management agent 112, SEG 108, and management server 130 need not be provided in all examples. For example, the email application 123 executing on the user device 110 can be developed to include the described functionality related to checking for whether users within a distribution list are out of office. In this way, an unmanaged email application 123 can display whether a user within a distribution list is out of office. The AD server 140 can perform any or all of the functionality described for the management server 130, SEG 108, or email server 150, in an example.

In one example, SEG 108 can also recognize automatically generated reply mails that indicate a user is out of office. A copy of the reply email or information extracted from it can be sent to the management server 130. This can allow the management server 130 to update a user profile 132 to indicate that the user is out of office. In one example, the SEG 108 parses the automatically generated reply to identify an alternate contact in the reply. For example, the reply might indicate another user or email address to contact in case of emergency. The user or contact can be isolated as the alternate contact and sent to the management server 130 in an example. Alternatively, the management server 130 can parse and determine the alternate contact based on receiving the reply from the SEG 108. The management server 130 can store the alternate contact as a dependency for the user. This can allow the management server 130 to retrieve and send the dependency to a sender device when the user is part of a distribution list during email composition.

The SEG 108 and management server 130 can encrypt and decrypt communications between each other. In one example, two key pairs are used for communications, with a separate pair used for each direction of communication. Using the key pairs, the management server 130 and SEG 108 can validate each other's identity, and encrypt and decrypt communications.

A first key pair can allow the management server 130 to validate the identity of the SEG 108. The management server 130 can store its own private key, and issue a public key to the SEG 108 that can be embedded into the SEG 108 during software installation. The management server 130 can receive a request to communicate from the SEG 108 that is signed with the public key that was provided to the SEG 108 from the management server 130. The management server 130 can recognize the request as coming from the SEG 108 by decrypting the public key with the private key at the management server 130.

A second key pair can be used when the management server 130 responds with its own secure signature. The second key pair can include a private key at the SEG 108, with a public key embedded at the management server 130 during software installation. The management server 130 can sign its response with the public key, which the SEG 108 can decrypt with the private key. The SEG 108 can encrypt an email, such as an email invite, using the public key from the management server 130. Encrypting the email can include encrypting the entire email, including one or more attachments. The SEG 108 can send the encrypted email to the management server 130.

In one example, the management server 130 can store dependency information for use in determining dependencies 138 based on email subject matter, email timing, or meeting timing. The management server 130 can collect this information based on emails, such as meeting invites, forwarded to the management server 130 from the SEG 108. The dependency information can include invitee information, attachments, and meeting timing. The management sewer 130 can decrypt, with its private key, the dependency information. Then the management server 130 can extract from user information (such as recipients or invitees), meeting, timing information, such as start and end time, and any attachments. This can be done by parsing the email invite in one example.

When the management server 130 needs to determine a dependency 138 to recommend for an email being composed by a sender, the management server 130 can compare contextual information to the dependency information. For example, the management server 130 can attempt to match other contacts in a distribution list to contacts in the dependency information, such as contacts in other emails sent or received by the sender. The management server 130 can also compare words in the subject of the email to words stored in the dependency information. In one example, the email application 123 can supply identifiers for any attachments, forwarded emails, or other content that is part of the email being composed. The management server 130 can compare those identifiers to identifiers stored in the dependency information. For example, the dependency information can include an email with the same attachment between the out-of-office user and another user. The management server 130 can identify the other user as a potential dependency for the out-of-office user, and include the other user in the notification to the email application 123 of the sender.

Although described as a including a management agent 112, management server 130, and SEG 108, the system of FIG. 1 need not include all or any of those components. Instead, the methods described can be implemented by email client 123 and email server 150.

Figure 2:
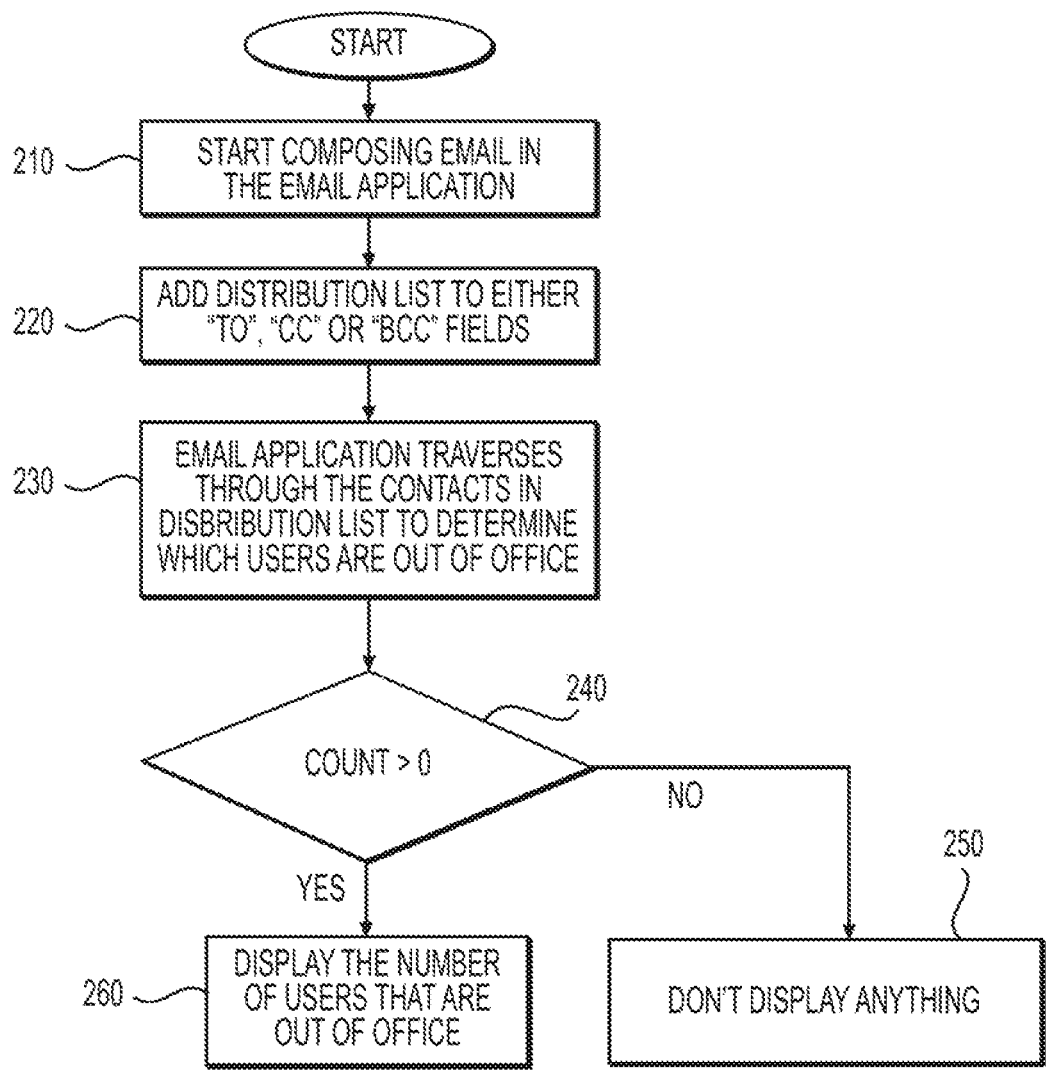
FIG. 2 is an exemplary method executed in a system.

FIG. 2 illustrates example method steps carried out by a system. At step 210, the sender can start composing an email in the email application 123. Composition can include selecting recipients for the email. As part of that, at step 220 the sender can add a distribution list to one of the recipient fields. The email application 123 can identify users and distribution lists in the recipient fields to the management server 130 (or AD server 140) as the email composition takes place. In one example, the email application 123 uses the management agent 112 to send the distribution list(s) or individual contacts to the server 130, 140, or 150.

At step 230, the email application 123 can traverse through the contacts in the distribution list to determine which users are out of office. This can include automatically expanding the distribution list in a background process, such as a process executed by the management agent 112. In one example, the background process can supply the distribution list to the server 130, 140, or 150 and receive back the contacts that are associated with the distribution list. Then, the background process can supply those contacts to the server 130 or 140 to determine if any of the users are out of office.

Alternatively, at step 230, the email application 123 can send a message that identifies the distribution list to the server 130 or 140. Then the server 130 or 140 can determine which contacts are associated with the distribution list and check each of the contacts for out-of-office status.

At step 240, the server 130 or 140 returns a notification to the email application 123 that can include a count of the number of out-of-office recipients in the distribution list. If the count is zero, then at step 250 the email application 123 can allow composition or sending to continue without interruption or alerts.

Alternatively, if the count is greater than zero, then at step 260 the email application 123 can display the number of recipients that are out of office. In one example, the number can display in the foreground of the email application GUI, next to or on top of the distribution list in the recipient field. In another example, the GUI can present a message box that requires the sender's interaction. For example, the message box can list the users in the distribution list that are out of office, and request approval or submission of dependencies 138.

Figure 3:
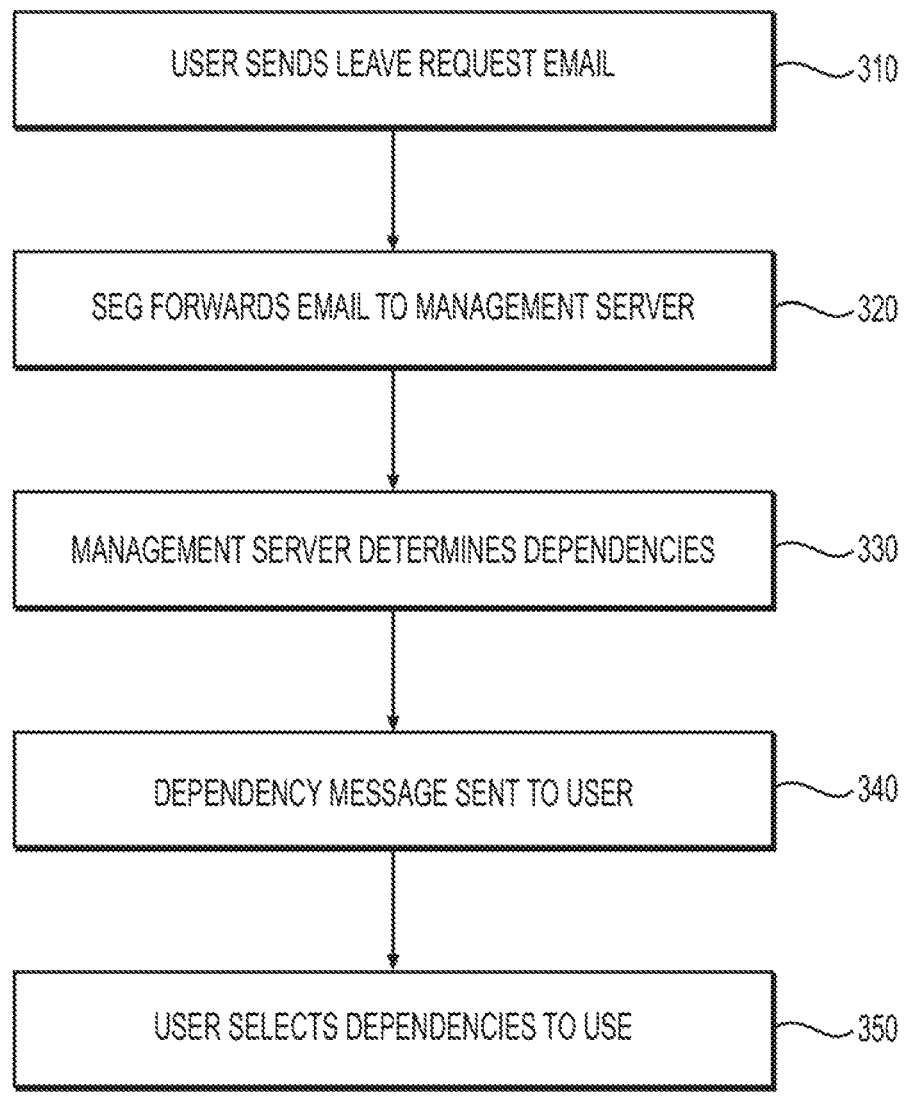
FIG. 3 is an exemplary method executed in a system.

FIG. 3 is an example method for receiving leave requests and adding dependencies 138 at the management server 130. At stage 310, the user can send a leave request email. The email application 123 can include a leave request option in one example that formats the email to have a subject line that indicates a leave request. Alternatively, the user can simply type "leave request" or other language that indicates the user is requesting leave.

At stage 320, the SEG 108, AD server 140, or email server 150 can receive the email and recognize it as a leave request email. The SEG 108, AD server 140, or email server 150 can make this recognition by parsing the subject line or body text for words indicative of leave. Alternatively, the email can have a tag or other identifier that the SEG 108 can read and interpret as indicative of a leave request. The leave request can also have a date range in one example.

In another example, the leave request email is an autoreply email setup by the user. The autoreply email can indicate that the user is out of office and can indicate a replacement user to contact in the user's absence. The SEG 108, AD server 140, or email server 150 can use similar methods to detect the autoreply email. For example, text parsing, autoreply tags, and date ranges can all be utilized by the SEG 108, AD server 140, or email server 150 in detecting an autoreply email. The SEG 108, AD server 140, or email server 150 can forward a copy of the leave request to the management server 130. Alternatively, the copy of the leave request can be forwarded to the AD server 140. The SEG 108, AD server 140, or email server 150 can also send the leave request along to the intended recipient, such as the user's manager.

At stage 130, the management server 130 can determine dependencies 138 to associate with the user. Alternatively, this can be done at the AD server 140. The dependencies 138 can be determined for the specific leave request in one example. This can be done by extracting a dependency frown the leave request email in one example. To determine a dependency from a leave request or autoreply email, the management server 130, AD server 140, or SEG 108 can look for an email address within the body of the autoreply email that is different from the user's email, and can check the CC field of the autoreply email. In one example, the management server 130, AD server 140, or email server 150 can store different dependencies 138 for different out-of-office periods associated with multiple leave requests from the same user.

In another example, the server 130, 140, or 150 can attempt to determine a dependency when one has not been provided by the user. This can include attempting to match attributes of a draft email to stored email attributes, and determining other contacts on the matching emails. The attributes can include an identifier of an email thread or an attachment to an email. This can allow the system to select potential dependencies 138 based on commonly occurring users for similar subject matter.

At stage 340, after the server 130, 140, or 150 determines one or more dependencies 138 for a meeting invite or other email from a sender, the server 130, 140, or 150 can send dependency information to the sender. For example, the dependency 138 can be sent as part of the notification. In one example, the notification can include multiple dependencies 138. This can allow the sender to select between potential dependencies 138 in an example, at stage 350. For example, the sender can select a dependency 138 through a GUI element presented within the email application 123.

Figure 4:
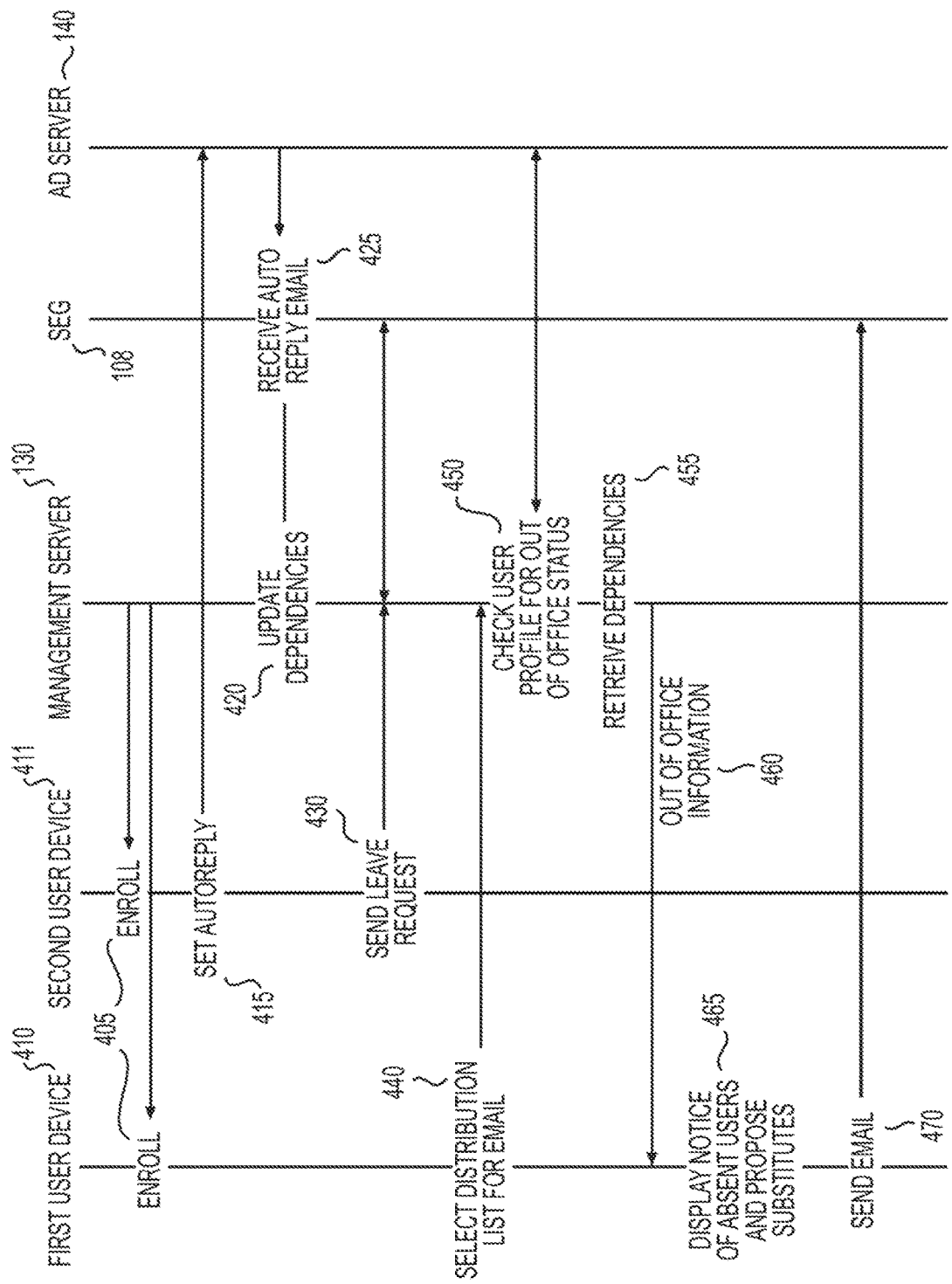
FIG. 4 is an exemplary method executed in a system.

FIG. 4 illustrates example stages performed by a system. At stage 405, first user device 410 can enroll with the management server 130. A second user device 411 can also enroll. As part of enrollment, the user devices 410 and 411 can be associated with user profiles 132 and groups 134 that can determine which applications, functions, and documents the user devices 410 and 411 can access. Management agents 112 can be installed on the user devices 410 and 411 as part of the enrollment processes. In one example, the email client 123 is also installed on the user devices 410 and 411. In another example, the user devices 410 and 411 are unmanaged and do not enroll with the management server 130.

At stage 415, a second user uses the email application 123 to set an autoreply. The autoreply can indicate when the second user will be out of the office, such as by providing a return date or by providing a date range within which the second user will be absent. Alternatively, at stage 415, the second user can submit a leave request for approval by a manager.

In one example, the leave request or autoreply is received at the AD server 140. The AD server 140 can store a record indicating when the second user will be out of office. In another example, the management server 130 receives and shares this information.

In one example, a third user can send an email to the second user while the second user is out of office. At stage 425, the SEG 108 can receive the autoreply email or leave request from the AD server 140 and forward a copy to the management server 130. The management server 130 can use the forwarded email to update out-of-office dates for the second user and for updating dependencies 138 for the second user. In another example, the AD server 140 can send dependency information directly to the management server 130 to be stored.

At stage 420, the management server 130 can update dependencies 138 for the second user. This can include storing an alternate contact in association with the second user for the out-of-office period indicated in the leave request or autoreply. Different periods can have different dependencies 138 in an example. Default dependencies 138, such as assistants to the second user, can also be stored for use in case no other dependency 138 is specified by the second user. In another example, the AD server 140 stores the dependencies 138.

In another example, a dependency 138 is determined in real time when the email is being composed. For example, the ranking of the out-of-office user compared to other users in the distribution list 136 can determine the dependency 138. If another user in the distribution list 136 has the same or higher ranking as the out-of-office user, the email application 123 can notify the sender that the other user can cover the out-of-office user. Alternatively, context-specific dependency 138 information, such as past emails, can be used to determine a dependency based on the email being composed.

At stage 430, the second user can send leave request from the second user device 411 to the management server 130. In the example shown in FIG. 4, the leave request can be routed through the SEG 108 to the management server 130. The management server 130 or AD server 140 can store this information for further use.

At stage 440, a first user can compose an email on the first user device 410. The email application 123 can include a GUI that allows the first user to select a distribution list 136. The email application 123 can be integrated with the management component 112, allowing it to communicate with the management server 130 or AD server 140. The management component 112 can be part of the email application 123, a background process that communicates with the email application 123, or an operating system process that communicates with the email application 123.

When the user adds the distribution list to the draft email, the management agent 112 can cause the management server 130 to check an out-of-office status for the associated users at stage 450. In one example, the email application 123 of the first user device 410 identifies the distribution list 136 to the management server 130. The management server 130 can match the contacts in the distribution list 136 to user profiles 132. The user profiles 132 can include date ranges for which the recipient users are out of office.

The management server 130 or AD server 140 can check the date ranges of each of the recipient users against an email date to determine if the recipient user will be out of office. When the email is a meeting invite, the email date checked can be a meeting date or a range of meeting dates. The email date can also be the current date and time. In one example, the management server 130 checks both. The notification returned by the management server 130 can indicate out-of-office recipients for both dates. This can allow the user to learn that some recipients will not respond to the email invite immediately, and that other recipients likely cannot make the future meeting.

At stage 455, the management server 130 or AD server 140 can retrieve dependencies 138 for the out-of-office second user. The dependencies 138 can be predetermined as described herein. Alternatively, they can be determined in real time based on the particular distribution list 136 and how the second user ranks compared to the other users in the distribution list 136. Contextual dependencies 138 for the second user can also be determined in real time. For example, the management server 130 can access or establish connecting relationships between the draft email and previously stored dependency information for the second user. These relationships can include a common attachment, a common subject, a common email-thread identifier, common recipients, and common tags within electronic communications. In one example, both predetermined and real-time dependencies 138 are retrieved for the second user.

At stage 460, the management server 130 or AD server 140 can send a notification to the email application 123 of the first user device 410. The notification can indicate how many of the users in the distribution list 136 are out of office. It can indicate different numbers for individuals that are currently out of office versus individuals that will be out of office during a proposed meeting date specified in the email. It can also identify the out-of-office users and dependencies 138. In the example of FIG. 4, the second user can be included in the notice as out of office. A dependency 138 that was parsed from the autoreply email at stages 420 and 425 can also be included with the notification. In addition, a contextual dependency can be included. The notice can further include rankings for the out of office users, including the second user. The rankings can determine how the email application 123 will handle displaying the various information provided with the notice.

At stage 465, the email application 123 of the first user device 410 can display a notice containing some or all of the notice information received from the management server 130. Based on the ranking of the second user exceeding a threshold, the email application 123 can display an alert that indicates the second user is out of office. The alert can also provide multiple alternative dependencies 138 for the first user to select between. The first user can select one or all of the dependencies 138, and the associated email contacts can be added to a recipient field of the draft email.

At stage 470, the first user can send the email by selecting a send option in the GUI. In one example, the send option is disabled until the user either selects or opts out of selecting dependencies 138 for the second user. This functionality can be based on the second user's ranking exceeding a threshold. In another example, a high ranking can cause an additional alert to be displayed when the first user selects send. The alert can prompt the first user to confirm that they want to send the email in view of the important out-of-office user's absence.

In general, the examples above can be performed by an AD server 140 that executes the functions described for the management server 130 and SEG 108.

Figure 5:
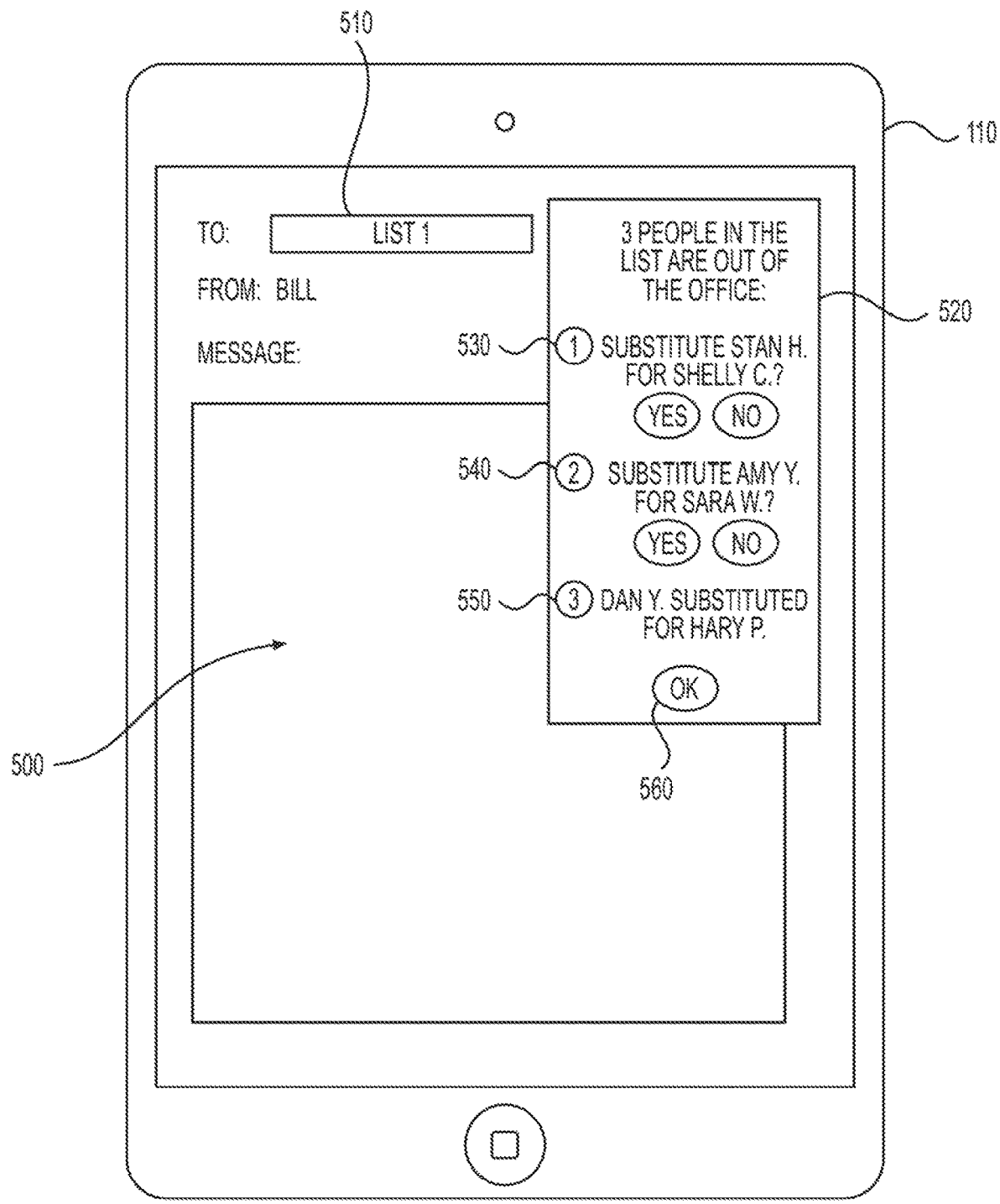
FIG. 5 is an exemplary illustration of a graphical user interface.

FIG. 5 is an example illustration of a GUI 500 of an email application 123 on a user device 110. The GUI 500 can include a recipient field, such as the TO field 510. In this example, the sender has entered a distribution list "List 1" in the TO field 510. In response, the email application 123 can contact a server 130 or 140 and receive back a notification regarding out-of-office recipients in the "List 1" distribution list.

The email application 123 can display some or all of the notification in alert 520. In one example, the alert 520 is displayed based on at least one out-of-office user exceeding a threshold ranking. The ranking can be computed relative to the other users in the distribution list 136. In this example, the alert 520 displays the number of out-of-office users.

The alert 520 can also include dependencies for one or more of the out-of-office users. In this example, three dependencies 530, 540, and 550 are included in the alert 520. The first two dependencies 530 and 540 provide the sender with an option as to whether to include the dependencies. The user can select "yes" or "no" for each. The option can be provided based on the rankings of "Stan H." and "Amy Y." falling beneath a threshold. Because "Stan H." and "Amy Y." are likely less important than some other users in the "List 1" distribution list, it might not be necessary to replace them.

Conversely, the alert 520 also includes a third dependency 550 for "Dan Y." that does not include the option for the sender to accept or reject the dependency. Instead, "Dan Y." is ranked highly enough that the email application 123 adds the dependency by default. The sender is simply notified of this addition. It is then up to the sender to actively remove the dependency "Hary P." from the recipient field 510 if the sender does not want to include him.

Figure 6:
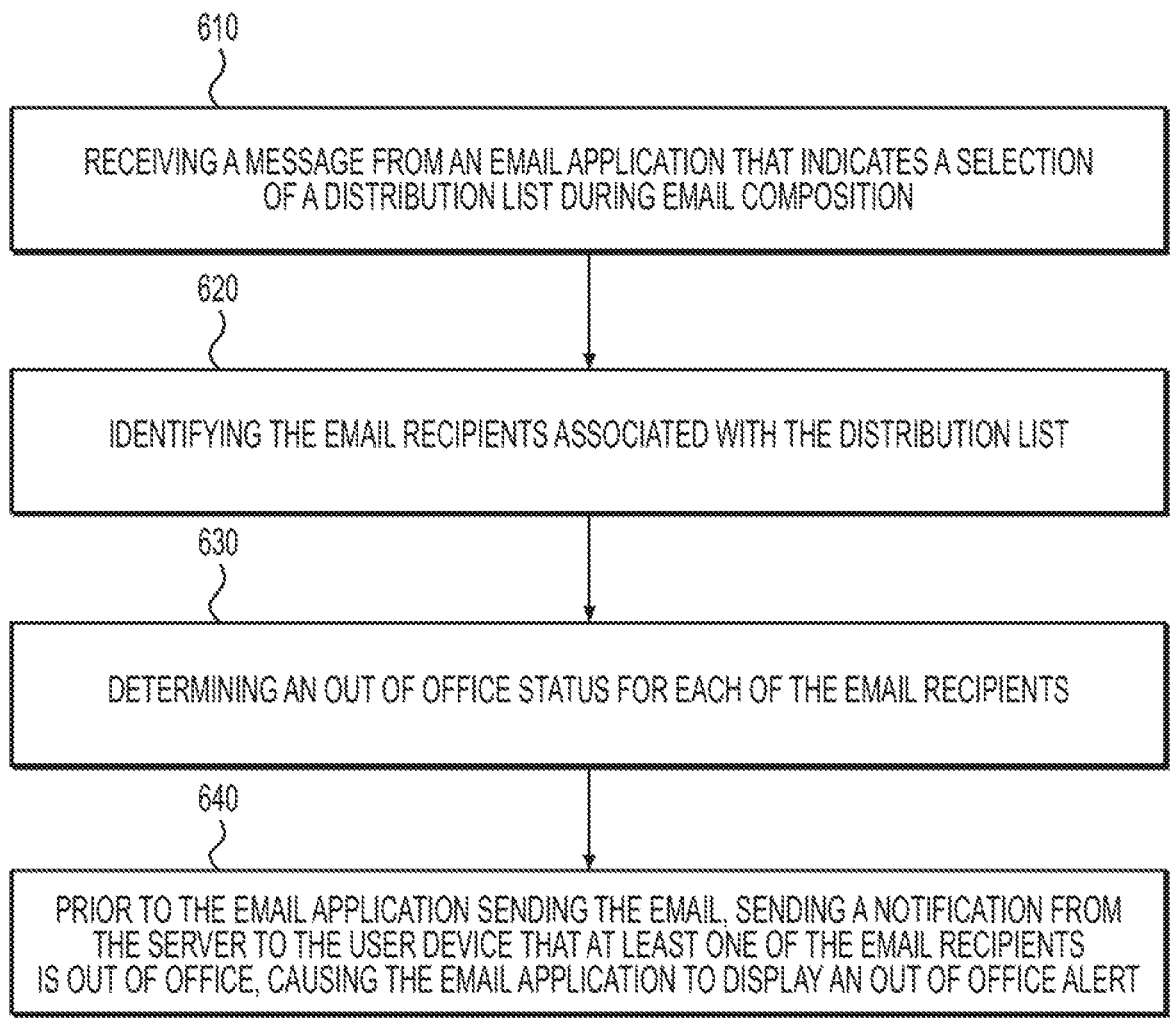
FIG. 6 is an exemplary method executed in a system.

FIG. 6 illustrates more example stages that can be performed by a system. At stage 610, a server can receive identification of a distribution list added to a draft email on a user device. The server can be the management server 130, die AD server 140, or some other server. The message can be sent from a managed or unmanaged email application. An email application can use a management agent to identify the distribution list, in one example. The functionality required for communicating with the server can alternatively be built into the email application 123.

In one example, the email application 123 executes on the user device 110, remotely from the server. This can include a stand-alone application that executes on the user device 110. Alternatively, the email application 123 can execute within a browser on the user device 110. A backend portion of the email application can execute on the management server 130 or the AD server 140.

The email application can be stored on a non-transitory, computer readable medium, such as a disk. The email application can be sent to the first user device for execution, such as by sending the application over the Internet or sending a physical copy of the non-transitory, computer-readable medium to the user.

In one example, the email application identifies the distribution list to the server by sending, to the server, the text typed added to a recipient field. The server 130 or 140 can then identify a distribution list. In one example, the server 130 or 140 returns the distribution list, causing the text in the recipient field to be resolved with the actual distribution list prior to stage 620. In another example, the server 130 or 140 performs stages 620 and 630 prior to sending a return message to the email application 123.

At stage 620, the system identifies the email recipients associated with the distribution list. This stage can be performed by the server 130, 140, 150, email application 123, or any combination of those components. In one example, a background process, such as the management agent 112, automatically expands the distribution list. The background process can contact the server 130 or 140 to request a list of recipients associated with the distribution list. The server 130 can look up and return the recipients in one example. Alternatively, the server 130 or 140 can perform stage 630 before returning the recipients.

At stage 630, the server 130 or 140 can determine an out-of-office status for each of the email recipients. This can be done in response to receiving identification of the distribution list in one example. In another example, when the background process expands the distribution list, the background process also sends a message identifying each recipient to the AD server 140 so that the AD server 140 can serially determine the out-of-office status for each of the recipients. Alternatively, the management server 130 can automatically perform stages 620 and 630 upon receiving the identification of the distribution list in stage 610.

The out-of-office status can be determined by comparing a target date, such as a meeting date or today's date, against date ranges in which the recipient is out of office. The target date can be determined based on the type of email being drafted by the sender. If the email is a meeting invite, the target date can be the start date or every date included in the meeting. Multiple target dates are possible. For example, both today's date and the meeting start date can be target dates. The out-of-office statuses can be determined separately for each target date. Similarly, the results can be reported separately for each target date.

At stage 640, the server 130 or 140 can send a notification to the email application 123 that a first email recipient is out of office. This can occur while the email is being drafted, prior to the email being sent. The notification can cause the email application 123 to display an out-of-office alert. The alert displayed can be based on the ranking associated with the out of office user(s). For users with rankings above a threshold, the management server 130 can disable some functionality within the GUI until dependencies are resolved.

The above examples should not be limited based on which of the management server 130, AD server 140, or other server performs the server-based stages. References to a server can include one or more of the management server 130, AD server 140, or another server. The server can include multiple different servers. Similarly, the examples are not limited to managed or unmanaged email applications 123. The management agent 112 can be part of the email application 123. Specifically, any part of the email application 123 that facilitates interaction between the email application 123 and the server 130 or 140 can be the management agent 112.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for assisting with email composition based on distribution lists having out-of-office users, the system comprising:

an email application on a non-transitory, computer-readable medium, the email application being executed on the first user device;

a server that securely communicates with the email application, wherein the server includes a memory store and a hardware processor that performs stages including:

receiving, from the email application, identification of a distribution list in a draft email, the distribution list comprising a plurality of recipients;

determining, at the server, the plurality of recipients in the distribution list;

determining, at the server, an out-of-office status for each of the plurality of email recipients associated with the distribution list; and prior to the email application sending the email, sending a notification to the email application indicating that a first email recipient in the distribution list is out of office and causing the email application, to display an out-of-office alert on the first user device.

2. The system of claim 1, wherein the server performs further stages comprising:

sending a management agent to the first user device for installation, the management, agent allowing the email application to communicate with the server.

3. The system of claim 1, wherein the email is a meeting invite, and wherein the server performs further stages comprising:

determining a ranking for the first email recipient relative, to other email recipients in the distribution list; and sending the ranking to the user device as part of the notification, wherein the out-of-office alert is displayed based on the ranking exceeding a threshold.

4. The system of claim 1, wherein the server performs further stages comprising:

retrieving a dependency user that is associated with the first user in a database;

identifying the dependency user in the notification; and causing the email application to prompt the sender about adding the dependency user as an additional email recipient prior to the draft email being sent.

5. The system of claim 4, further comprising a secure email gateway that performs stages including:

receiving a reply email sent on behalf of the first user;

identifying the reply email as an out-of-office reply that lists an alternate contact; and sending information associated with the alternate contact to the server to be stored as the dependency user.

6. The system of claim 4, wherein retrieving the dependency user includes retrieving a history of dependency users for the first user, wherein the server sends the history of dependency users as part of the notification.

7. The system of claim 1, wherein the email application automatically expands the distribution list in a background process and separately sends the associated email recipients to the server for determining the out-of-office status.

8. A non-transitory, computer-readable medium containing instructions, executed by at least one processor of a server to assist with email composition, the stages comprising:

receiving, at the server from an email application executing on a user device, a distribution list of email recipients selected by a sender while composing an email, the distribution list comprising a plurality of recipients;

determining, at the server, the plurality of recipients in the distribution list determining, at the server, an out-of-office status for each of the plurality of email recipients; and prior to the email application sending the email, sending a notification to the email application of the user device that a first email recipient is out of office, causing the email application to display an out-of-office alert on the first user device.

9. The non-transitory, computer-readable medium of claim 8, wherein the email is a meeting invite, and wherein the at least one processor performs further stages comprising:

determining a ranking for the first user based a user profile associated with the first user; and sending the ranking to the user device as part of the notification, wherein the out-of-office alert is displayed based on the ranking exceeding a threshold.

10. The non-transitory, computer-readable medium of claim 9, wherein the ranking of the first user is done relative to rankings of the other email recipients.

11. The non-transitory, computer-readable medium of claim 8, the stages further comprising:

retrieving a dependency user that is associated with the first user in a database;

identifying the dependency user in the notification; and causing the email application to prompt the sender about adding the dependency user as an additional email recipient prior to the email being sent.

12. The non-transitory, computer-readable medium of claim 11, the stages further comprising:

receiving, at a secure email gateway, a reply email sent on behalf of the first user;

identifying the reply email as an out-of-office reply that lists an alternate contact; and sending the alternate contact to the server from the secure email gateway, wherein the management server stores the alternate contact as the dependency user in association with the first user.

13. The non-transitory, computer-readable medium of claim 11, wherein retrieving the dependency user includes retrieving a history of dependency users for the first user, wherein the management server sends the history of dependency users as part of the notification.

14. The non-transitory, computer-readable medium of claim 8, the stages further comprising:

sending a management agent to a first user device for installation, the management agent causing an email application to communicate with a management server, wherein the management agent causes the email application to expand the distribution list, wherein receiving the distribution list of email recipients includes receiving, from the management agent, separate identification of each of the email recipients.

15. A method for providing alerts to assist in email composition, comprising:

receiving, at a server, identification of a distribution list added to a draft email in an email application executing on a user device, the distribution list comprising a plurality of recipients;

identifying the plurality of email recipients associated with the distribution list;

determining, at the server, the plurality of recipients in the distribution list;

determining, at the server, an out-of-office status for each of the identified email recipients based on stored out-of-office information; and prior to the email application sending the email, sending a notification from the server to the email application that a first email recipient is out of office, causing the email application to display an out-of-office alert.

16. The method of claim 15, further comprising:

determining a ranking for the first user based a user profile associated with the first user; and sending the ranking to the user device as part of the notification, wherein the email is a meeting invite and the out-of-office alert is displayed based on the ranking exceeding a threshold.

17. The method of claim 16, wherein the ranking of the first user is determined relative to rankings of the other email recipients associated with the distribution list.

18. The method of claim 15, further comprising
retrieving a dependency user that is associated with the first user in a database;
identifying the dependency user in the notification, causing the email application to add the dependency user as an additional email recipient prior to the email being sent.

19. The method of claim 18, further comprising:
receiving, at a secure email gateway, a reply email that is automatically generated based on settings for the first user;
identifying, at the secure email gateway, the email as an out of office reply that lists an alternate contact;
sending the alternate contact to the server from the secure email gateway; and
storing the alternate contact as the dependency user in association with the first user.

20. The method of claim 15, wherein identifying the email recipients includes automatically expanding the distribution list within the email application.

\* \* \* \* \*